United States Patent
Teranishi et al.

(10) Patent No.: US 9,639,905 B2
(45) Date of Patent: May 2, 2017

(54) POWER CONTROL APPARATUS, ELECTRONIC COMPUTER, AND POWER CONTROL METHOD

(71) Applicant: FUJITSU LIMITED, Kawasaki-shi, Kanagawa (JP)

(72) Inventors: Yuta Teranishi, Kawasaki (JP); Koichiro Yamashita, Hachioji (JP); Takahisa Suzuki, Yokohama (JP); Hiromasa Yamauchi, Usakos (NA); Koji Kurihara, Kawasaki (JP); Toshiya Otomo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 396 days.

(21) Appl. No.: 14/248,874

(22) Filed: Apr. 9, 2014

(65) Prior Publication Data

US 2014/0222229 A1  Aug. 7, 2014

Related U.S. Application Data

(63) Continuation of application No. PCT/JP2011/076330, filed on Nov. 15, 2011.

(51) Int. Cl.
*G06Q 50/06* (2012.01)
*G06F 1/32* (2006.01)
*G06Q 10/06* (2012.01)

(52) U.S. Cl.
CPC .......... *G06Q 50/06* (2013.01); *G06F 1/324* (2013.01); *G06F 1/3253* (2013.01);
(Continued)

(58) Field of Classification Search
CPC ...... G06F 1/324; G06F 1/3253; G06F 1/3296; G06Q 10/06; G06Q 50/06; Y02B 60/1217; Y02B 60/1235; Y02B 60/1285
See application file for complete search history.

(56) References Cited

U.S. PATENT DOCUMENTS 5,630,145 A * 5/1997 Chen ............... G06F 1/3215
                                                  710/312
6,000,035 A * 12/1999 Matsushima ...... G06F 1/3215
                                                  713/320
(Continued)

FOREIGN PATENT DOCUMENTS

| JP | 2006-072991 A | 3/2006 |
| JP | 2008-077640 A | 4/2008 |
| JP | 2008-287592 A | 11/2008 |

OTHER PUBLICATIONS

International Search Report, Japanese Patent Application No. PCT/JP2011/0763330 dated Dec. 13, 2011.

*Primary Examiner* — Thomas Lee
*Assistant Examiner* — Chad Erdman
(74) *Attorney, Agent, or Firm* — Arent Fox LLP

(57) ABSTRACT

A power control apparatus includes a processor configured to collect first information related to operation of a performing unit configured to perform data processing and information related to operation of a bus configured to transfer data; determine an operating frequency and an operating voltage for the performing unit, based on the collected information; estimate based on the collected information, a period elapsing until the performing unit suspends operation and a period elapsing until the bus suspends operation; derive a discriminant that obtains a difference of total power consumption and power consumption pre-switching; and execute a switching of an operating frequency and an operating voltage of the performing unit, based on a value of the discriminant.

15 Claims, 10 Drawing Sheets

(52) U.S. Cl.
CPC ........... *G06F 1/3296* (2013.01); *G06Q 10/06* (2013.01); *Y02B 60/1217* (2013.01); *Y02B 60/1235* (2013.01); *Y02B 60/1285* (2013.01)

(56) References Cited

U.S. PATENT DOCUMENTS

| | | | | |
|---|---|---|---|---|
| 8,527,994 B2* | 9/2013 | Bose | ...................... | G06F 9/5094 |
| | | | | 713/300 |
| 2006/0031692 A1* | 2/2006 | Kato | ...................... | G06F 1/3203 |
| | | | | 713/300 |
| 2008/0077815 A1 | 3/2008 | Kanakogi | | |
| 2008/0288796 A1 | 11/2008 | Nakamura et al. | | |
| 2009/0158061 A1* | 6/2009 | Schmitz | ................ | G06F 1/3228 |
| | | | | 713/300 |
| 2012/0102345 A1* | 4/2012 | Park | ...................... | G06F 1/3215 |
| | | | | 713/322 |
| 2012/0110351 A1* | 5/2012 | Raju | ...................... | G06F 1/3203 |
| | | | | 713/300 |
| 2012/0140286 A1* | 6/2012 | Ueda | ...................... | G06F 1/3228 |
| | | | | 358/1.16 |

\* cited by examiner

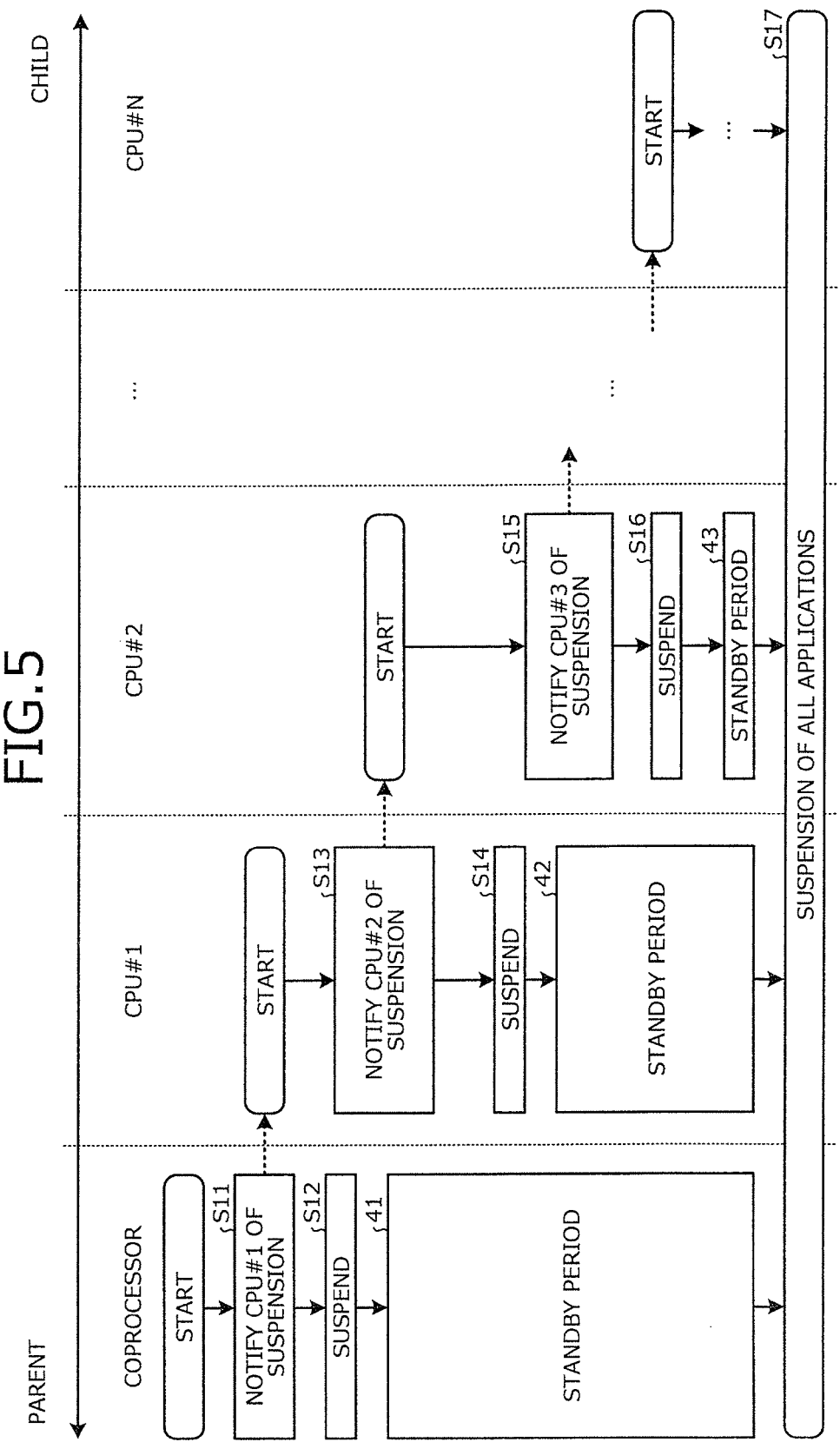

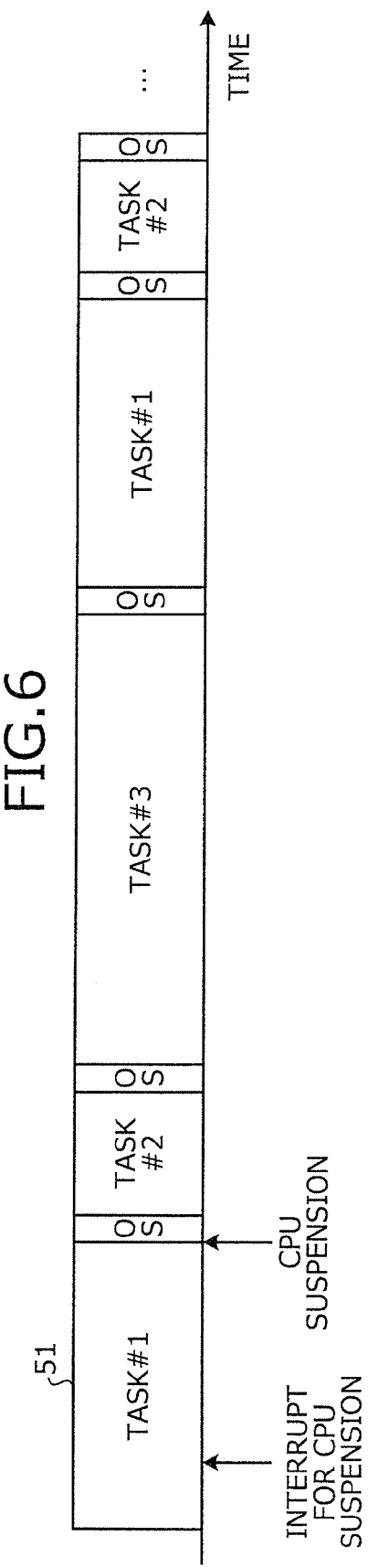

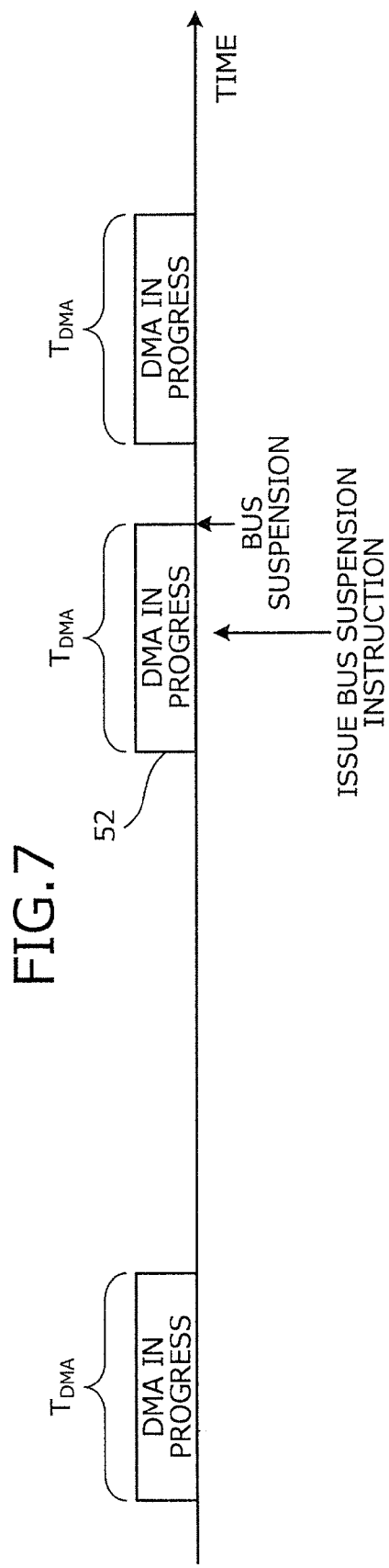

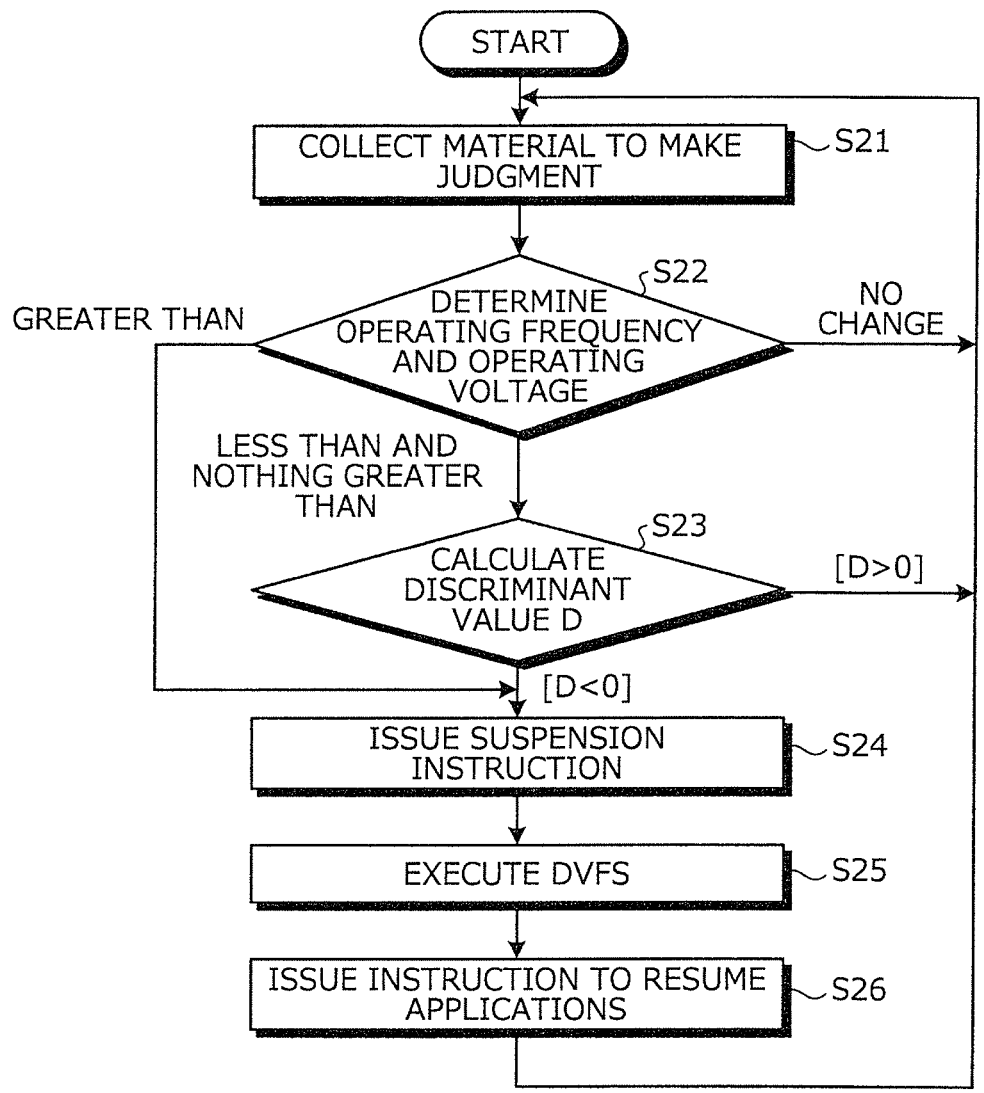

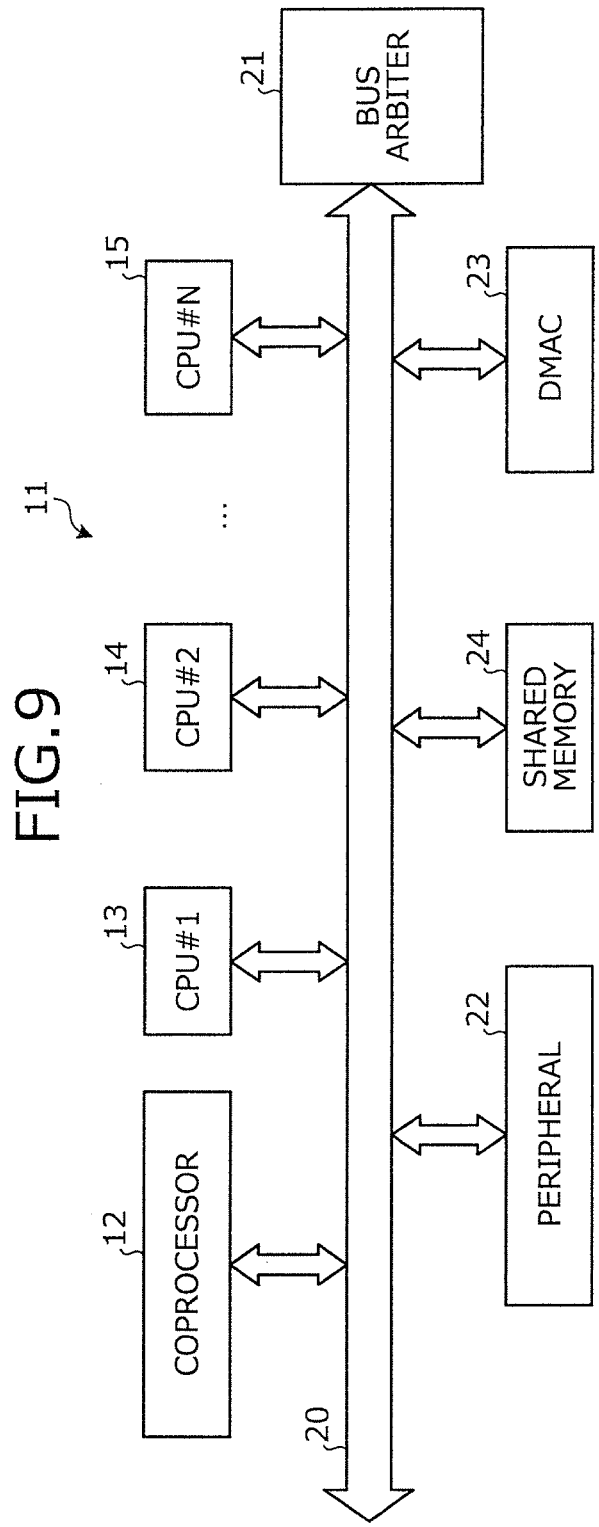

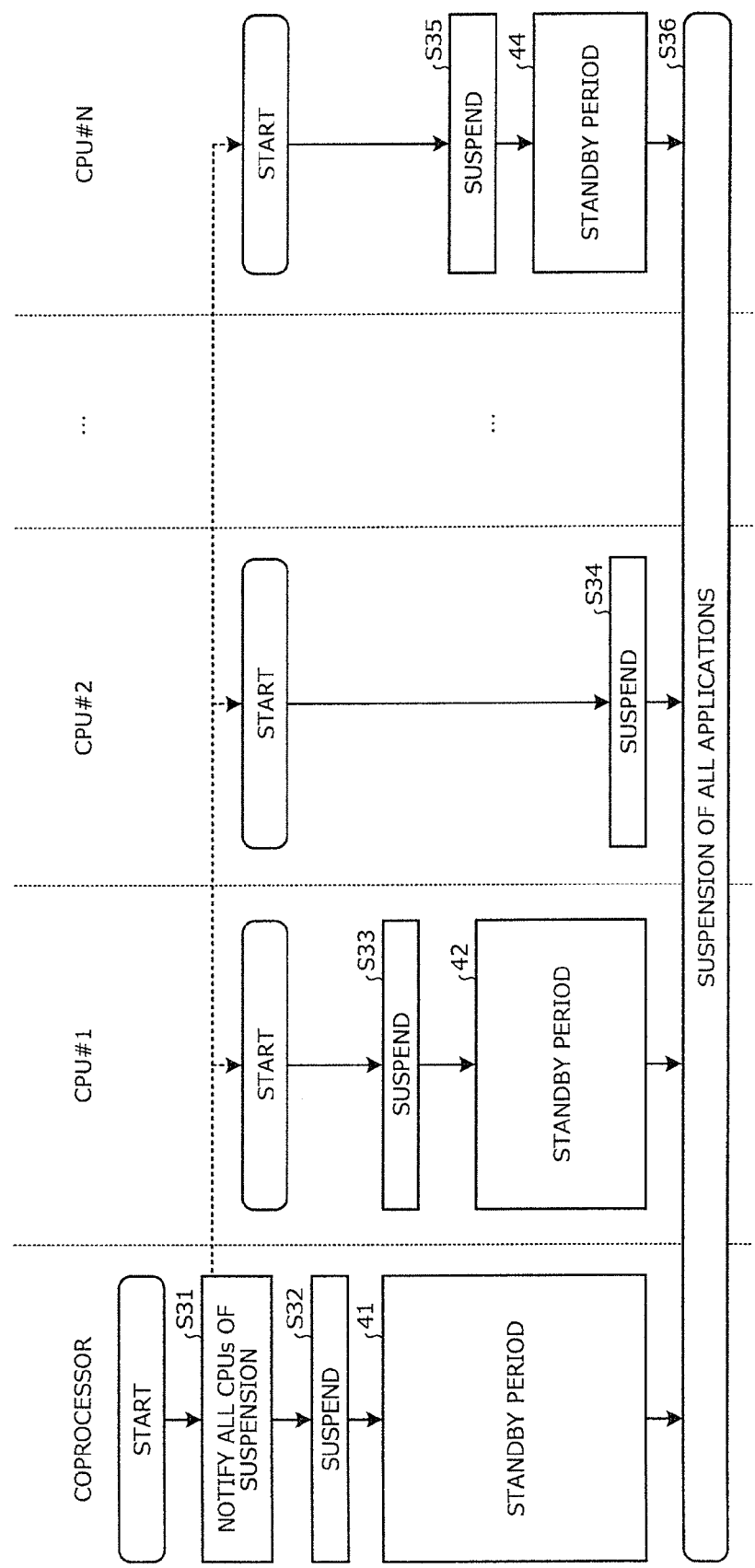

POWER CONTROL APPARATUS, ELECTRONIC COMPUTER, AND POWER CONTROL METHOD

CROSS REFERENCE TO RELATED APPLICATIONS

This application is a continuation application of International Application PCT/JP2011/076330, filed on Nov. 15, 2011 and designating the U.S., the entire contents of which are incorporated herein by reference.

FIELD

The embodiments discussed herein are related to a power control apparatus, an electronic computer, and a power control method.

BACKGROUND

Conventionally, in a multiprocessor system having multiple processors, a method of reducing power consumption by executing programs using the lowest possible frequency and source voltage (dynamic voltage and frequency scaling (DVFS)) is employed. For example, according to one method, at least the frequency of the processors or the source voltage is controlled within a range of satisfying performance constraints of programs executed by the processors (for example, refer to Japanese Laid-Open Patent Publication No. 2008-287592).

Nonetheless, with conventional DVFS, when the frequency and the source voltage of the processors are changed, power consumption during the period elapsing until suspension of the data processing by the processing unit or suspension of the bus is not considered. Therefore, a problem arises in that irrespective of switching to low frequency or low source voltage by DVFS, after adding the power consumed during the period until the data processing or the bus is suspended, the power consumption after the switch may be greater than before the switch.

SUMMARY

According to an aspect of an embodiment, a power control apparatus includes a processor configured to collect first information related to operation of a performing unit configured to perform data processing and second information related to operation of a bus configured to transfer data; determine an operating frequency and an operating voltage for the performing unit, based on the first information and the second information; estimate based on the first information and the second information, a first period elapsing until the performing unit suspends operation and a second period elapsing until the bus suspends operation; derive a discriminant that obtains a difference of total power consumption and power consumption pre-switching, where the total power consumption is power consumed in a case of switching the operation of the performing unit based on the determined operating frequency and operating voltage plus power consumed during the estimated first and second periods; and execute a switching of an operating frequency and an operating voltage of the performing unit, based on a value of the discriminant.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram of operations until data processing is suspended at all CPUs in the electronic computer according to the second embodiment;

FIG. 6 is a diagram of operations until a suspension of one CPU in the electronic computer according to the second embodiment;

FIG. 7 is a diagram of operations until a suspension of a bus in the electronic computer according to the second embodiment;

FIG. 8 is a flowchart of the power control method according to the second embodiment;

FIG. 9 is a block diagram of a hardware configuration of the electronic computer according to a third embodiment; and FIG. 10 is a diagram of operations until data processing is suspended at all of the CPUs in the electronic computer according to the third embodiment.

DESCRIPTION OF EMBODIMENTS

Figure 1:
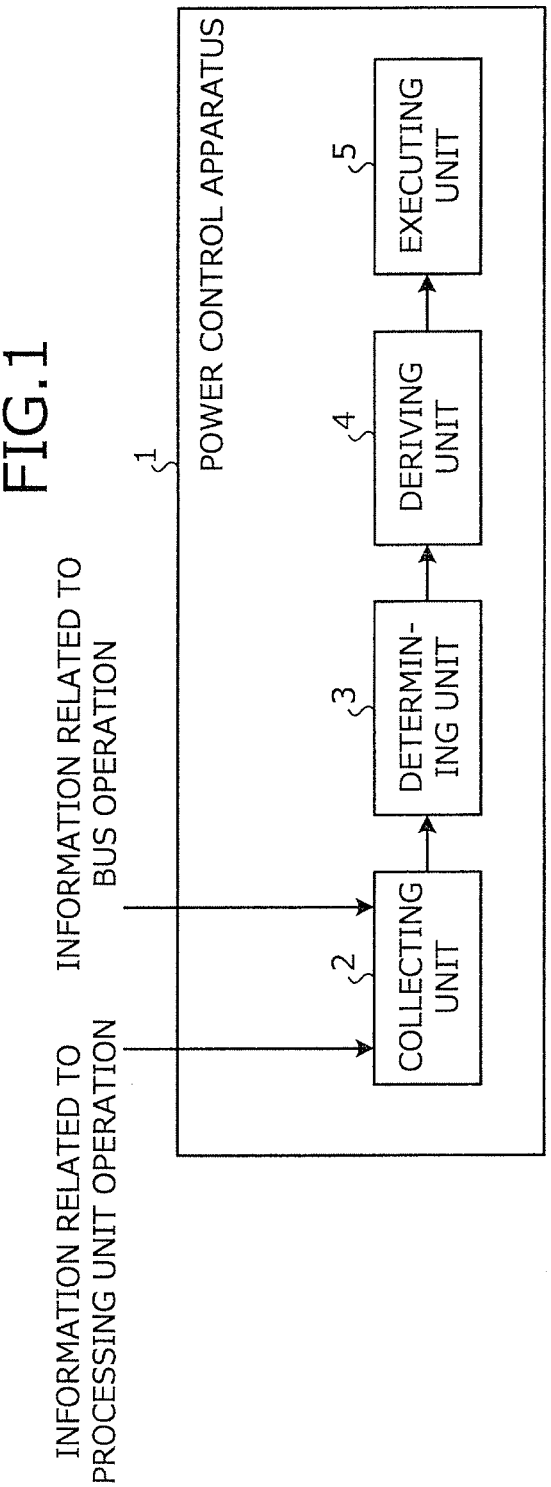
FIG. 1 is a block diagram of a configuration of a power control apparatus according to a first embodiment.

Embodiments of a power control apparatus, an electronic computer, and a power control method will be described in detail with reference to the accompanying drawings. In the description of the embodiments, identical components are given the same reference numerals and redundant explanation is omitted. Furthermore, the present invention is not limited by the embodiments.

FIG. 1 is a block diagram of a configuration of a power control apparatus according to a first embodiment. As depicted in FIG. 1, a power control apparatus 1 includes a collecting unit 2, a determining unit 3, a deriving unit 4, and an executing unit 5. The collecting unit 2, the determining unit 3, the deriving unit 4, and the executing unit 5 may be implemented, for example, by executing on a processor, a program that implements the power control method described hereinafter.

The collecting unit 2 collects information related to the operation of a processing unit (performing unit, not depicted) that performs data processing. For example, information related to processing unit operation may include information concerning the load of a task under execution by the processing unit. Further, the collecting unit 2 collects information related to the operation of a bus (not depicted) that transmits data. For example, information related to bus operation may include information indicating whether the bus is being operated for direct memory access and information concerning the data volume transferred by 1 direct memory access.

The determining unit 3 determines the post-switching operating frequency and the post-switching operating voltage of the processing unit, based on the information related to the processing unit operation and the information related to the bus operation, collected by the collecting unit 2.

The deriving unit 4 estimates the period that elapses until the processing unit suspends operation, based on the information related to the processing unit operation collected by the collecting unit 2. The deriving unit 4 estimates the period that elapses until the bus suspends operation, based on the information related to the bus operation collected by the collecting unit 2. The deriving unit 4, based on the operating frequency and the operating voltage determined by the determining unit 3, calculates the total power consumption by adding the power consumed during the period estimated to elapse until the processing unit and the bus are suspended, to the power consumed in the case of the operation of the processing unit being switched. The deriving unit 4 derives a discriminant that obtains the difference of the calculated total power consumption and the pre-switching power consumption.

The executing unit 5 executes a switching of the operating frequency and of the operating voltage of the processing unit, based on the value of the discriminant. For example, the executing unit 5 may execute the switch when the value obtained by subtracting the pre-switching power consumption from the total power consumption, which is the power consumed in the case of switching the operation of the processing unit plus the power consumed during the period estimated to elapse until the processing unit and the bus are suspended, is less than 0.

Figure 2:
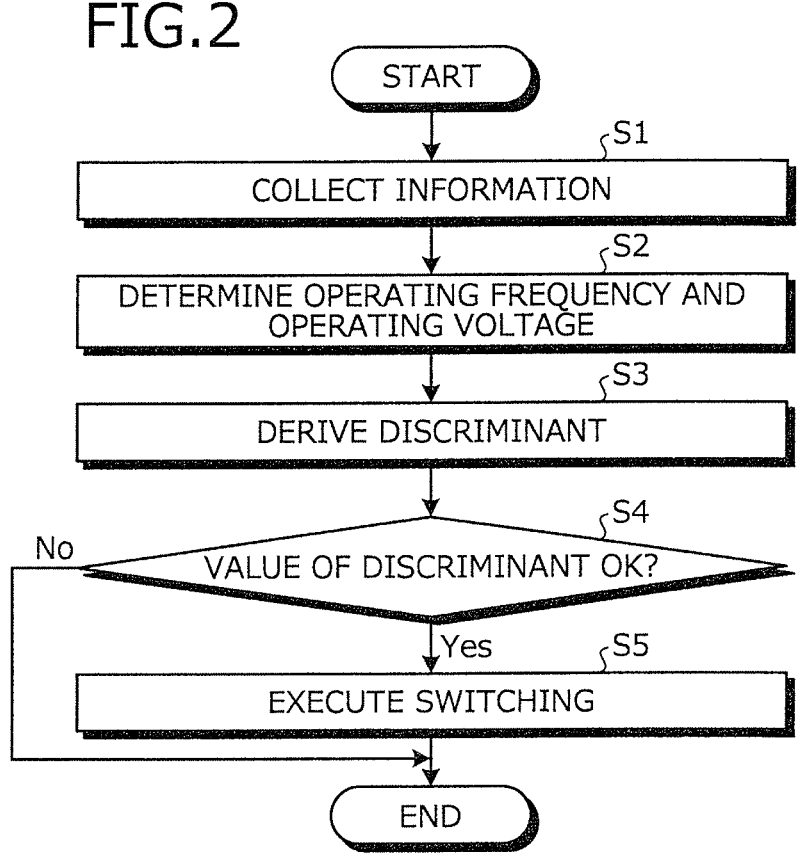
FIG. 2 is a flowchart of a power control method according to the first embodiment.

FIG. 2 is a flowchart of the power control method according to the first embodiment. As depicted in FIG. 2, in the power control apparatus 1, when the power control method is started, the collecting unit 2 collects information related to the processing unit operation and information related to the bus operation (step S1). The determining unit 3 determines the post-switching operating frequency and the post-switching operating voltage of processing unit, based on the information related to the processing unit operation and the information related to the bus operation collected by the collecting unit 2 (step S2).

The deriving unit 4 estimates the period that elapses until the processing unit and the bus are suspended. The deriving unit 4 obtains the total power consumption, which is the power consumed in the case of switching the operation of the processing unit plus the power consumed during the period estimated to elapse until the operations are suspended. The deriving unit 4 derives a discriminant that obtains the difference of the total power consumption and the pre-switching power consumption (step S3).

If the value of the discriminant satisfies a switching condition (step S4: YES), the executing unit 5 executes a switching of the operating frequency and the operating voltage of the processing unit to the operating frequency and the operating voltage determined by the determining unit 3 (step S5), ending a series of operations. On the other hand, for example, if the value of the discriminant does not satisfy the switching condition (step S4: NO), the executing unit 5 does not execute a switching of the operating frequency or the operating voltage, and ends a series of operations.

According to the first embodiment, whether power consumption will decrease consequent to switching can be estimated by adding to the post-switching power consumption, the power consumed during the period estimated to elapse until the processing unit and the bus are suspended. Therefore, increases in power consumption consequent to switching can be prevented by not executing a switch when the total power consumption, which is the post-switching power consumption plus the power consumed during the period estimated to elapse until the processing unit and the bus are suspended, is greater than the pre-switching power consumption. Further, power consumption can be reduced by executing a switch when the total power consumption is less than the pre-switching power consumption.

A second embodiment is an example in which the power control apparatus according to the first embodiment is applied to an apparatus that controls DVFS of an electronic computer. Examples of the electronic computer include, for example, computers such as a personal computer and a work station, and mobile information devices such as personal digital assistants (PDAs). Further examples include mobile terminals such as mobile telephones and so-called smartphones that have combined functions of a mobile telephone and a mobile information terminal, various types of instruments, and various types of electronic-apparatus-embedded systems.

Figure 3:
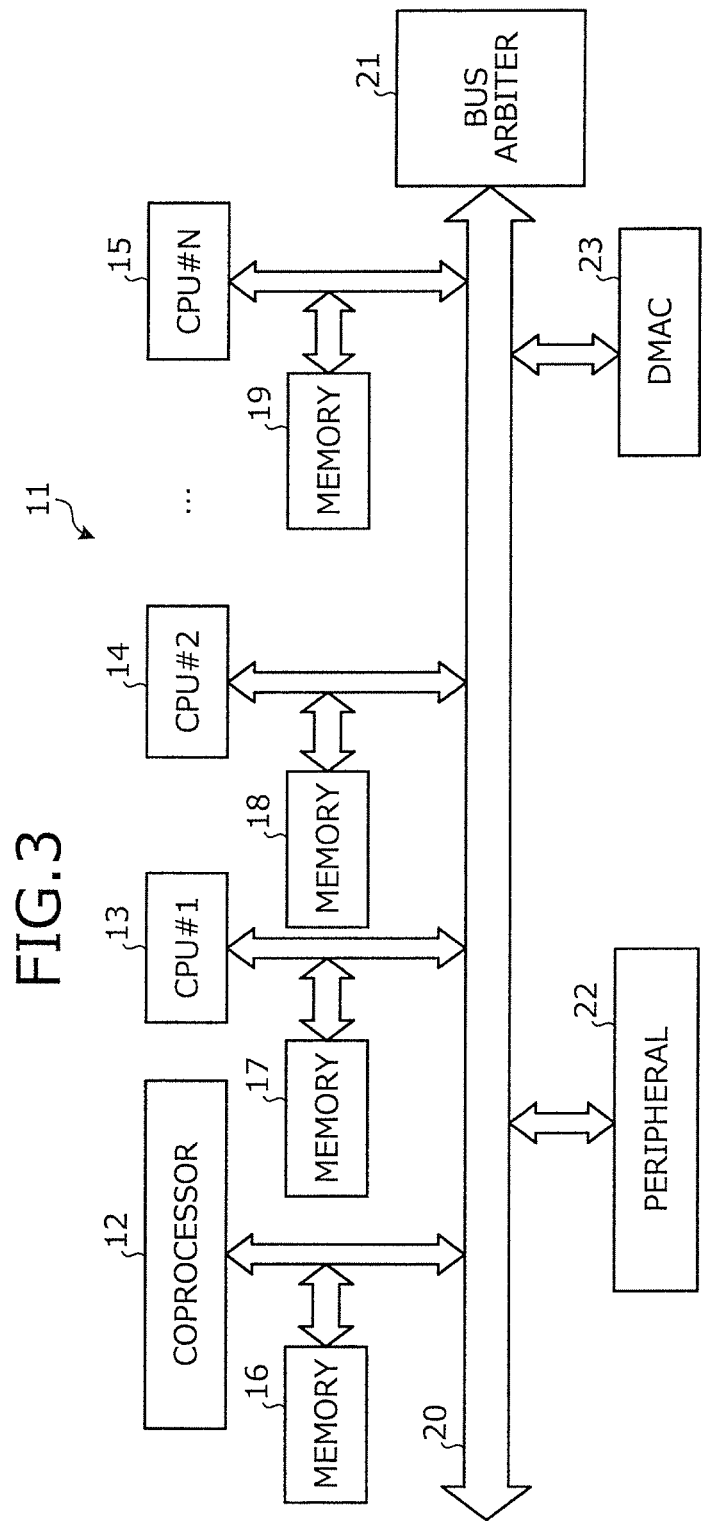
FIG. 3 is a block diagram of a hardware configuration of an electronic computer according to a second embodiment.

FIG. 3 is a block diagram of a hardware configuration of the electronic computer according to the second embodiment. As depicted in FIG. 3, an electronic computer 11 includes a coprocessor 12 and N central processing units (CPUs) (#1, #2, . . . , #N) 13 to 15 as an example of the processing units. N is an integer of 2 or more. In FIG. 3, although 3 or more CPUs are depicted, the number of CPUs may be 2.

The coprocessor 12 controls DVFS with respect to the CPUs (#1, #2, . . . , #N) 13 to 15. For example, the coprocessor 12 issues a data processing suspension instruction for the CPUs (#1, #2, . . . , #N) 13 to 15, when the operating frequency and/or the operating voltage of the CPUs (#1, #2, . . . , #N) 13 to 15 is/are switched by DVFS. Further, for example, the coprocessor 12 issues an operation suspension instruction for a bus 20, when the operating frequency and/or the operating voltage of the CPUs (#1, #2, . . . , #N) 13 to 15 is/are switched by DVFS.

The CPUs (#1, #2, . . . , #N) 13 to 15 process in parallel, tasks assigned thereto. Task assignment may be performed by a scheduler implemented by an execution of an operating system (OS) on a CPU. Here, description is given assuming that the CPU#1_13 executes the OS. The CPUs (#1, #2, . . . , #N) 13 to 15 may be, for example, microprocessors of a multiprocessor system, or cores of a multicore processor.

The electronic computer 11 is a distributed-memory-type computing device and for example, may be independent of the coprocessor 12, the CPU#1_13, the CPU#2_14, . . . , and the CPU#N_15, and connected to memory 16 to 19. The memory 16 to 19 are used as work areas by the coprocessor 12 and the CPUs (#1, #2, . . . , #N) 13 to 15. Random access memory (RAM) may is an example of the memory 16 to 19.

The coprocessor 12, the CPUs (#1, #2, . . . , #N) 13 to 15, and the memory 16 to 19 are connected to the bus 20. A bus arbiter 21, a peripheral (peripheral apparatus) 22 and a direct memory access controller (DMAC) 23 are connected to the bus 20. The bus 20 transmits data between the components 12 to 19, and 21 to 23 connected to the bus 20.

The peripheral 22 may be, for example, an input apparatus such as a keyboard, a keypad, a touch panel, a mouse, a microphone, etc., an output apparatus such as display, a speaker, a motor for oscillation, etc., and an external memory apparatus such as various types of memory cards. The DMAC 23 controls direct memory access between the memory 16 to 19 and the peripheral 22. The bus arbiter 21 arbitrates use privileges of the bus 20 between the CPUs (#1, #2, . . . , #N) 13 to 15, which are bus masters, and the DMAC 23.

Figure 4:
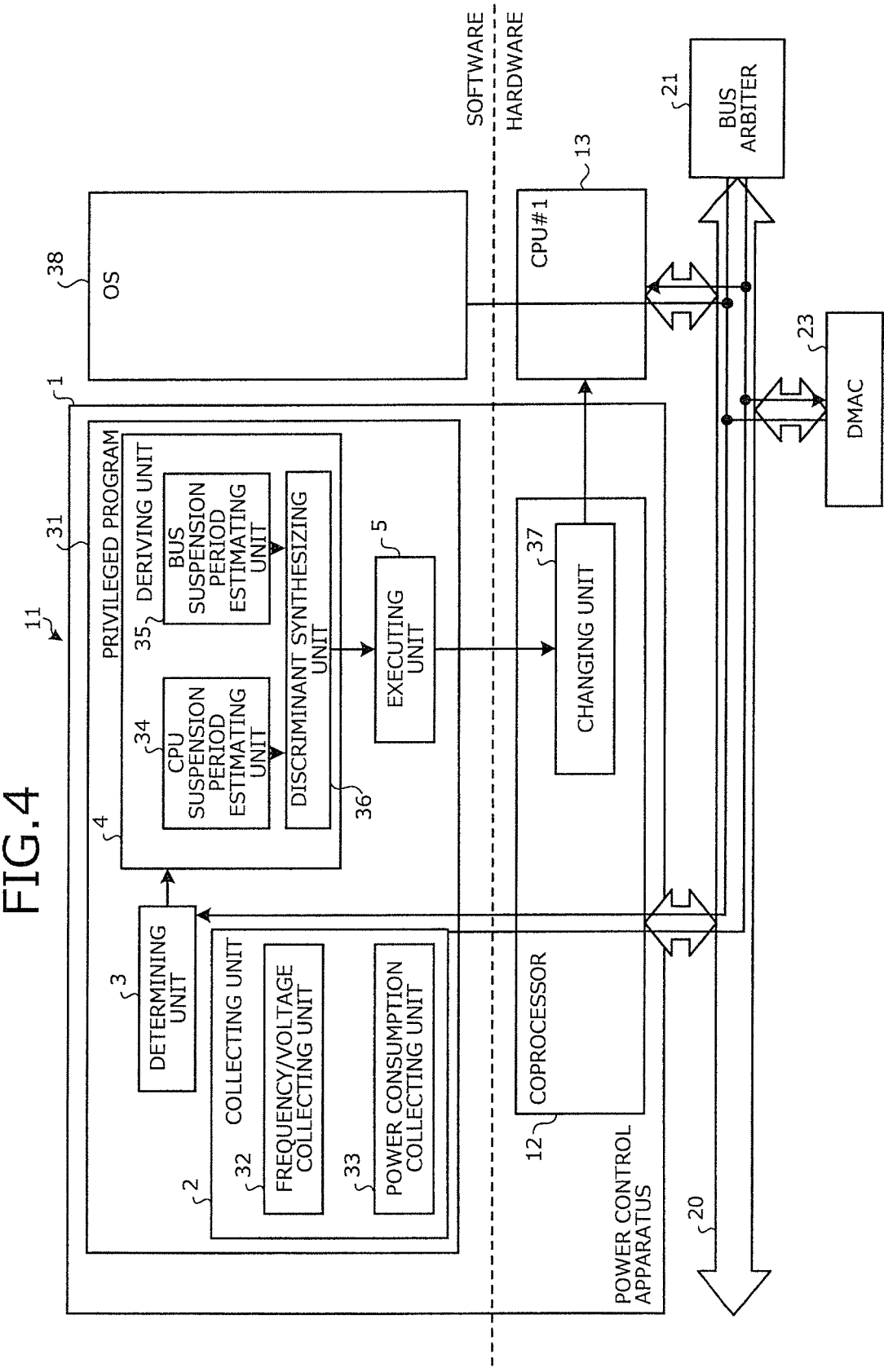
FIG. 4 is a block diagram of a functional configuration of the electronic computer according to the second embodiment.

FIG. 4 is a block diagram of a functional configuration of the electronic computer according to the second embodiment. As depicted in FIG. 4, in the electronic computer 11, the power control apparatus 1 is implemented by executing a privileged program 31, which is software, by the coprocessor 12, which is hardware. Execution of the privileged program 31 implements the collecting unit 2, the determining unit 3, the deriving unit 4, and the executing unit 5.

The information collected by a request from the collecting unit 2 may be sent directly to the determining unit 3, or may be initially sent to the collecting unit 2 and sent from the collecting unit 2 to the determining unit 3. Here, description will be given assuming that the collected information is directly sent to the determining unit 3. The collecting unit 2 has a frequency/voltage collecting unit 32 and a power consumption collecting unit 33.

The frequency/voltage collecting unit 32 requests information related to the operation of the CPUs (#1, #2, . . . , #N) 13 to 15 from an OS 38 executed by the CPU#1_13. In response to the request from the frequency/voltage collecting unit 32, the OS 38 provides to the determining unit 3, the information related to the operation of the CPUs (#1, #2, . . . , #N) 13 to 15.

Examples of the information related to the operation of the CPUs (#1, #2, . . . , #N) 13 to 15 include a deadline period, which is the remaining time given to complete a task at the CPUs (#1, #2, . . . , #N) 13 to 15, and information concerning the longest execution period of a task to be executed. The longest execution time of a task may be preliminarily obtained for each task, by simulation, for example.

The power consumption collecting unit 33 requests information related to the operation of the CPUs (#1, #2, . . . , #N) 13 to 15 from the OS 38 and requests information related to the operation of the bus 20 from the bus arbiter 21 and the DMAC 23. In response to the request from the power consumption collecting unit 33, the OS 38 provides to the determining unit 3, the information related to the operation of the CPUs (#1, #2, . . . , #N) 13 to 15. In response to the request from the power consumption collecting unit 33, the bus arbiter 21 and the DMAC 23 provide to the determining unit 3, the information related to the operation of the bus 20.

Examples of the information related to the operation of the CPUs (#1, #2, . . . , #N) 13 to 15 include information concerning the average execution period until completion of a task under execution at the CPUs (#1, #2, . . . , #N) 13 to 15, and information concerning the load of a task under execution. Examples of the information related to the operation of the bus 20 include information indicating whether direct memory access is in progress, and information concerning the period occupied by the bus 20 for 1 direct memory access. Information indicating whether direct memory access is in progress is obtained from the bus arbiter 21, for example. Information concerning the occupied period of the bus 20 is obtained from the DMAC 23, for example. If the information related to the operation of the CPUs (#1, #2, . . . , #N) 13 to 15 and of the bus 20 is recorded in the OS 38, the frequency/voltage collecting unit 32 and the power consumption collecting unit 33 can obtain the information from the OS 38.

The determining unit 3, for example, determines the post-DVFS switching operating frequency and the post-DVFS switching operating voltage of the CPUs (#1, #2, . . . , #N) 13 to 15, based on a deadline period of the CPUs (#1, #2, . . . , #N) 13 to 15 and/or information concerning the longest execution period of a task. For the CPUs (#1, #2, . . . , #N) 13 to 15, a low operating frequency and a low operating voltage within a range satisfying the deadline period are, for example, determined by the determining unit 3. For example, in the case of a complementary metal oxide semiconductor (CMOS) circuit, power consumption is proportional to the operating frequency multiplied by the square of the operating voltage and therefore, if the operating frequency and the operating voltage are low, the power consumption has a possibility of being reduced.

The deriving unit 4 has a CPU suspension period estimating unit 34, a bus suspension period estimating unit 35, and a discriminant synthesizing unit 36.

The CPU suspension period estimating unit 34 estimates standby periods arising at the CPUs (#1, #2, . . . , #N) 13 to 15. The standby periods are from an issuance of a data processing suspension instruction by the coprocessor 12, until the data processing is suspended by all of the CPUs (#1, #2, . . . , #N) 13 to 15.

The bus suspension period estimating unit 35 estimates the period required from the issuance of an operation suspension instruction for the bus 20 by the coprocessor 12, until the bus 20 suspends operation. A method of estimating the operation suspension period for the bus 20 will be described hereinafter.

The discriminant synthesizing unit 36 obtains an estimated value of power consumption for a case where DVFS is executed and an estimated value of power consumption for a case where DVFS is not executed. The discriminant synthesizing unit 36 derives based on the obtained estimated values of power consumption, a discriminant for judging whether DVFS is to be executed, and obtains a value. A discriminant derivation method will be described hereinafter.

The executing unit 5 determines whether DVFS is to be executed based on the value of the discriminant. For example, the executing unit 5 executes DVFS when the estimated value of power consumption in a case where DVFS is executed is less than the estimated value of power consumption in a case where DVFS is not executed. For example, the executing unit 5 does not execute DVFS when the estimated value of power consumption in a case where DVFS is executed is greater than the estimated value of power consumption in a case where DVFS is not executed. If DVFS is to be executed, the executing unit 5 issues a suspension instruction for suspending data processing at the CPUs (#1, #2, . . . , #N) 13 to 15 and issues a suspension instruction for suspending operation of the bus 20.

The coprocessor 12 includes a changing unit 37. If the executing unit 5 determines that DVFS is to be executed, the changing unit 37 changes the operating frequency and the operating voltage of the CPUs (#1, #2, . . . , #N) 13 to 15 to the operating frequency and the operating voltage determined by the determining unit 3. In FIG. 4, although the changing unit 37 is depicted to change the operating frequency and the operating voltage of the CPU#1_13, the changing unit 37 also changes the operating frequency and the operating voltage of the non-depicted CPUs (#2, . . . , #N) 14, 15.

FIG. 5 is a diagram of operations until data processing is suspended at all the CPUs in the electronic computer according to the second embodiment. As depicted in FIG. 5, in the architecture of the second embodiment, parent/child relations among the coprocessor 12, the CPU#1_13, the CPU#2_14, . . . , and the CPU#N_15 are assumed. Further, messages are assumed to be sent only between a processor regarded as a parent and a processor regarded as a child.

In the example depicted, the coprocessor 12 is regarded as the parent of the CPU#1_13 and the CPU#1_13 is regarded as the child of the coprocessor 12. Further, a CPU#[N−1]

(not depicted) is regarded as the parent of the CPU#N_15 and the CPU#N_15 is regarded as the child of the CPU#[N−1].

When DVFS is to be executed, the coprocessor 12 first issues to the CPU#1_13 regarded as the child, a data processing suspension instruction and gives notification of a suspension of data processing (step S11). The coprocessor 12 suspends operation (step S12). After the suspension of the operation, the period until the data processing of all the CPUs (#1, #2, #N) 13 to 15 is suspended is a standby period 41 of the coprocessor 12.

The CPU#1_13, upon receiving notification of the data processing suspension from the coprocessor 12, notifies the CPU#2_14 regarded as the child, of the suspension of data processing (step S13). The CPU#1_13 suspends the data processing (step S14). After the suspension of the data processing, the period until the data processing at the remaining CPUs (#2, . . . , #N) 14, 15 processing data is suspended is a standby period 42 of the CPU#1_13.

The CPU#2_14, upon receiving notification of the data processing suspension from the CPU#1_13, notifies the CPU#3 (not depicted) regarded as the child, of the suspension of data processing (step S15). The CPU#2_14 suspends the data processing (step S16). After the suspension of the data processing, the period until the data processing by the remaining CPUs (#3, . . . , #N) 15 processing data is a standby period 43 of the CPU#2_14.

The same operations are performed by the CPU#3 and subsequent CPUs. When the last remaining CPU processing data, the CPU#N_15, has been suspended data processing, all applications are suspended (step S17). Therefore, no standby period arises for the CPU#N_15. During the standby periods 41 to 43 of the coprocessor 12 and the CPUs (#1, #2, . . . , #[N−1]) 13, 14, power is wastefully consumed.

FIG. 6 is a diagram of operations until a suspension of one CPU in the electronic computer according to the second embodiment. Although the operations until a CPU suspends data processing are the same for each of the CPUs (#1, #2, . . . , #N) 13 to 15, description will be given taking the CPU#113 as an example.

As depicted in FIG. 6, for example, the CPU#1_13 is assumed to recursively execute task #1, task #2, and task #3, sequentially. For example, upon receiving a CPU suspension interrupt during execution of a given cycle of task #1_51, the CPU#1_13 suspends operation at the point in time when the task #1_51, which is under execution when the interrupt is received, is completed.

The input timing of the CPU suspension interrupt to the CPU#1_13 during the execution of the task #1_51 is arbitrary. Therefore, the average time from the input of the CPU suspension interrupt to the CPU#1_13, until the CPU#1_13 is suspended may be regarded as the time assigned for task #1_51 by the OS 38, i.e., ½ the time of a time slice.

Assuming that the load of the task #1_51 is $S_{(1)}$, the average time from the input of the CPU suspension interrupt to the CPU#1_13, until the suspension of the CPU#1_13 can be estimated as $\alpha S_{(1)}$, where $\alpha$ is the constant of proportionality.

Since the input timing of the CPU suspension interrupt to the CPU#1_13 is arbitrary, if the CPU#1_13 receives the CPU suspension interrupt during execution of the task #2 or task #3, the same is true. Therefore, the average time from the receipt of a CPU suspension interrupt by the CPU#1_13, until the suspension of the CPU#1_13 is expressed by equation (1).

$$\alpha S_{(1)} \cdot (S_{(1)}/(S_{(1)}+S_{(2)}+S_{(3)})) + \alpha S_{(2)} \cdot (S_{(2)}/(S_{(1)}+S_{(2)}+S_{(3)})) + \alpha S_{(3)} \cdot (S_{(3)}/(S_{(1)}+S_{(2)}+S_{(3)})) \quad (1)$$

Where, the load of each task #1 to #m assigned to the k-th CPU (CPU#k) is $S_{(1)k}, \ldots, S_{(m)k}$; and m is an integer of 2 or more, and may vary according to the value of k. "k" is an integer of 1 to N. A period $S_k$ from the input of a CPU suspension interrupt to the CPU#k, until the suspension of the data processing of the CPU#k is expressed by equation (2), where, i and j are integers of 1 to m.

$$S_k = \sum_i \left\{ \alpha S_{(i)k} \cdot \left( S_{(i)k} / \sum_j S_{(j)k} \right) \right\} \quad (2)$$

Therefore, for the k-th CPU (CPU#k), a standby period $T_{CPU\_k}$ from the suspension of the data processing, until all applications are suspended is a sum of the periods until the [k+1]-th to the N-th CPUs suspend data processing and is expressed by equation (3). Where, for the sake of simplicity, when the coprocessor 12 is indicated as the 0-th CPU, i.e., the CPU#0, equation (3) further includes the standby period of the coprocessor 12. In other words, in equation (3), k is an integer of 0 to N.

$$T_{CPU\_k} = \begin{cases} \sum_{i=k+1}^{N} S_i & (k \neq N) \\ 0 & (k = N) \end{cases} \quad (3)$$

FIG. 7 is a diagram of operations until the bus is suspended in the electronic computer according to the second embodiment. As depicted in FIG. 7, when the coprocessor 12 issues an operation suspension instruction for the bus 20 during an execution of direct memory access (DMA) 52, the bus 20 suspends operation at the point in time when the DMA, which is under execution when the suspension instruction is issued, is completed.

The timing at which a suspension instruction for the bus 20 is issued during the execution of DMA 52 is arbitrary. Therefore, assuming the period occupied by the bus 20 for 1 direct memory access is $T_{DMA}$, an expected value of the period required from an issuance of a bus suspension instruction during the execution of DMA 52, until the bus 20 is suspended is $[T_{DMA}/2]$. If a bus suspension instruction is issued when DMA is not under execution, the bus 20 immediately suspends operation. Assuming the period required from the issuance of a suspension instruction for the bus 20, until the suspension of the bus 20 is $T_{BUS}$, $T_{BUS}$ is expressed by equation (4).

$$T_{BUS} = \begin{cases} T_{DMA}/2 & (\text{DMA IN PROGRESS}) \\ 0 & (\text{ELSE}) \end{cases} \quad (4)$$

In equation (4), "else" includes cases when DMA is not under execution. Here, $T_{DMA}$ is proportional to the data transfer volume for 1 DMA. The data transfer volume for 1 DMA is expressed by equation (5). Equation (5) indicates that the data transfer volume for 1 DMA is the smaller of an upper limit of the data transfer volume transferred by 1 DMA and the data transfer volume requested of the DMAC by the CPU.

$$\min\{\text{UPPER LIMIT OF DATA TRANSFER VOLUME FOR 1 DMA}\} \quad (5)$$

Here, the discriminant derivation method will be described. The power of the CPU#0 (the coprocessor 12), the CPU#1_13, . . . , the CPU#N_15 before execution of DVFS is assumed to be $P_{0\_high}$, $P_{1\_high}$, . . . , $P_{N\_high}$, respectively. The power of the CPU#0 (the coprocessor 12), the CPU#1_13, . . . , the CPU#N_15 after execution of DVFS is assumed to be $P_{0\_low}$, $P_{1\_low}$, $P_{N\_low}$, respectively.

Where, $[P_{i\_high} \geq P_{i\_low}]$ is assumed to be satisfied for an integer i of 1 or more, and the power of the coprocessor 12 is assumed to be constant. In other words, when i is 0, $[P_{0\_high} = P_{0\_low}]$ is assumed.

1. Power Consumption when DVFS is not Executed

In the CPU#i whose power consumption before DVFS execution is $P_{i\_high}$, the average time until a task under execution is completed with the power $P_{i\_high}$ is assumed to be $T_{i\_high}$. In this case, the total power consumed by all of the CPUs until the task is completed in the CPU#i, is estimated to be $P_1$ expressed in equation (6). In other words, the power consumption of all the CPUs (including the coprocessor 12) when DVFS is not executed is estimated to be $P_1$.

$$P_1 = \sum_{i=0}^{N} P_{i\_high} T_{i\_high} \qquad (6)$$

2. Power Consumption when DVFS is Executed

In the CPU#i, the average time from a lowering of the power to $P_{i\_low}$, until the task under execution is completed is assumed to be $T_{i\_low}$. In this case, the total power consumed by all of the CPUs, from an issuance of a CPU suspension instruction by the coprocessor 12, until the completion of the task at the CPU#i, is estimated to be $P_2$ expressed in equation (7). In other words, the power consumption of all the CPUs (including the coprocessor 12) when DVFS is executed is estimated to be $P_2$.

$$P_2 = \sum_{i=0}^{N} P_{i\_low} T_{i\_low} + \sum_{i=0}^{N} P_{i\_high}(T_{CPU\_i} + T_{BUS'}) + \text{Const} \qquad (7)$$

On the right side of equation (7), the first term expresses the power consumed by all of the CPUs for task execution; the second term expresses the power consumed by all of the CPUs during preparation for DVFS execution; and "Const" of the third term expresses the power consumption for DVFS. The sum of the power consumption expressed by the second and third terms is the overhead for executing DVFS. $T_{CPU\_i}$ is the period from an issuance of a CPU suspension instruction by the coprocessor 12, until the suspension of the CPU#i. $T_{BUS'}$ is the period from the suspension of all of the CPUs, until the suspension of the bus 20. $T_{BUS'}$ is expressed by equation (8). In other words, $T_{BUS'}$ is the larger value among 0 and, $T_{BUS}$ less the largest value of $T_{CPU\_k}$. If the value of $T_{BUS'}$ is 0, a state is indicated where the bus 20 has suspended operation while a CPU performing data processing is present.

$$T_{BUS'} = \max\{0, T_{Bus} - \max\{T_{CPU\_k} | k=0,1, \ldots, N\}\} \qquad (8)$$

3. Discriminant Synthesis

The discriminant may be, for example, an equation subtracting the power consumption $P_1$ when DVFS is not executed from the power consumption $P_2$ when DVFS is executed. In this case, a value D of the discriminant is expressed by equation (9).

$$D = P_2 - P_1 = \sum_{i=0}^{N} (P_{i\_low} T_{i\_low} - P_{i\_high} T_{i\_high}) + \qquad (9)$$
$$\sum_{i=0}^{N} P_{i\_high}(T_{CPU\_i} + T_{BUS'}) + \text{Const}$$

4. Judgment of Whether to Execute DVFS

When the value D of the discriminant is less than 0, power consumption is estimated to be lower with execution of DVFS than without execution of DVFS and therefore, DVFS may be executed. When the value D is 0 or more, power consumption is considered to not change or increase even with execution of DVFS and therefore, DVFS need not be executed.

FIG. 8 is a flowchart of the power control method according to the second embodiment. As depicted in FIG. 8, in the electronic computer 11, when the power control method is started, the collecting unit 2, for example, periodically requests the OS 38, the bus arbiter 21, and/or the DMAC 23 to provide information used in judging whether to execute DVFS. Consequently, at the determining unit 3, information concerning, for example, the deadline period for task completion, the longest execution period of a task, the average execution period for task completion, the loads of the CPUs (#1, #2, . . . , #N) 13 to 15 and whether DMA is in progress, is collected (step S21).

Based on the collected information, the determining unit 3 determines the operating frequency and the operating voltage of the CPUs (#1, #2, . . . , #N) 13 to 15 for a case where DVFS is executed (step S22). If the determined operating frequency and operating voltage do not change for any of the CPUs (#1, #2, . . . , #N) 13 to 15, i.e., values thereof are the same as the current values (step S22: no change), the flow returns to step S21.

If a CPU is present for which the determined operating frequency and operating voltage are less than the current values thereof and no CPU is present for which the values are greater than the current values (step S22: less than and nothing greater than), the deriving unit 4 derives a discriminant and calculates the value D thereof (step S23). If the value D of the discriminant is greater than 0 (step S23: D>0), the flow returns to step S21.

If the value D of the discriminant is less than 0 (step S23: D<0), the executing unit 5 issues a suspension instruction for suspending the data processing at the CPUs (#1, #2, . . . , #N) 13 to 15 and issues a suspension instruction for suspending operation of the bus 20 (step S24). Consequently, the data processing at all of the CPUs (#1, #2, . . . , #N) 13 to 15 and the operation of the bus 20 are suspended.

Thereafter, the changing unit 37 executes DVFS, upon receiving notification that suspension of all of the CPUs (#1, #2, . . . , #N) 13 to 15 and the bus 20 has been completed (step S25). Consequently, the operating frequency and the operating voltage of the CPUs (#1, #2, . . . , #N) 13 to 15 are switched to the operating frequencies and the operating voltages determined at step S22. The executing unit 5 issues an instruction to the CPUs (#1, #2, . . . , #N) 13 to 15, to resume the applications (step S26). Consequently, the CPUs (#1, #2, . . . , #N) 13 to 15 resume data processing. The flow returns to step S21 and the series of operations are repeated.

If a CPU is present for which the operating frequency and the operating voltage determined by the determining unit 3 are greater than the current values thereof (step S22: greater than), the operation at step S23 is omitted and the flow proceeds to step S24. In this case, for a CPU for which the operating frequency and the operating voltage are greater than the current values thereof, the operating frequency and the operating voltage thereof are switched to values that are greater than the current values by DVFS because continuation of the data processing at the current operating frequency and operating voltage cannot satisfy the deadline period and therefore, data processing has to be performed faster than the current speed.

As example where power consumption can be reduced more when DVFS is not executed than in a case where DVFS is executed, will be described as an example of an effect of the second embodiment. For simplicity, in the configuration depicted in FIG. 3, the electronic computer 11 is assumed to have 2 CPUs (#1, #2) 13, 14.

For example, the tasks #A and #B are assumed to be under execution by the CPU#1_13 and the tasks #0 and #D are assumed to be under execution by the CPU#2_14. Further, the time slice for the tasks #A and #B is assumed to be 2 msec; and the time slice for the tasks #0 and #D is assumed to be 1 msec. The power consumption of the coprocessor 12 is assumed to be 10 mW; the power consumption of the CPU#1_13 is assumed to be 100 mW; and the power consumption of the CPU#2_14 is assumed to be 50 mW. The period until the tasks #A and #B are completed is 10 msec and the period until the tasks #0 and #D are completed is 5 msec.

With the operation state above, the power consumption for completion of all the tasks in a case where DVFS is not executed is expressed by equation (10). In equation (10), the first term on the left side expresses the power consumption of the coprocessor 12; the second term expresses the power consumption of the CPU#1_13; and the third term expresses the power consumption of the CPU#2_14.

Power consumption if DVFS not executed:

$$10 \text{ (mW)} \times 10 \text{ (msec)} + 100 \text{ (mW)} \times 10 \text{ (msec)} + 50 \text{ (mW)} \times 5 \text{ (msec)} = 1350 \text{ (mW} \times \text{msec)} \quad (10)$$

Next, the determining unit 3 is assumed to half the frequency of the CPU#2_14 and accordingly, is further assumed to lower the power to 20 mW. In this case, since the frequency of the CPU#2_14 has been halved, the period until the tasks #0 and #D are completed becomes 10 msec, 2 times the 5 msec above. Therefore, the power consumption for completion of all the tasks in a case where DVFS is executed is expressed by equation (11). In equation (11), the first term on the left side expresses the power consumption of the coprocessor 12; the second term expresses the power consumption of the CPU#1_13; and the third term expresses the power consumption of the CPU#2_14.

$$10 \text{ (mW)} \times 10 \text{ (msec)} + 100 \text{ (mW)} \times 10 \text{ (msec)} + 20 \text{ (mW)} \times 10 \text{ (msec)} = 1300 \text{ (mW} \times \text{msec)} \quad (11)$$

In a simple comparison of equations (10) and (11), power consumption when DVFS is executed decreases more than in a case where DVFS is not executed. However, when DVFS is executed, overhead arises and therefore, consideration of overhead power consumption is also desirable.

When DVFS is executed, the CPU#1_13 and the CPU#2_14 are suspended. The average time from an issuance of a CPU suspension instruction by the executing unit 5, until suspension of the CPU#1_13 is expected to be ½ the time slice assigned to the tasks by the OS 38. The same is true for the CPU#2_14. Therefore, the period consumed from the issuance of the CPU suspension instruction, until the suspension of the CPU#1_13 and the CPU#2_14 is expressed on average by equation (12).

$$2 \text{ (msec)} \times 1/2 + 1 \text{ (msec)} \times 1/2 = 1.5 \text{ (msec)} \quad (12)$$

From equation (12), in the present example, the period consumed from the issuance of the CPU suspension instruction, until the suspension of the CPU#1_13 and the CPU#2_14 is 1.5 msec on average. In other words, at the coprocessor 12, a standby period of 1.5 msec on average arises and at the CPU#1_13, a standby period of 0.5 msec on average arises. The power consumed during these standby periods is expressed by equation (13).

$$10 \text{ (mW)} \times 1.5 \text{ (msec)} + 100 \text{ (mW)} \times 0.5 \text{ (msec)} = 65 \text{ (mW} \times \text{msec)} \quad (13)$$

Therefore, the power consumption in a case where DVFS is executed is a sum of the value of equation (11) and the value of equation (13), and is expressed by equation (14). From equation (14), execution of DVFS with consideration of DVFS overhead results in greater power consumption than in a case where DVFS is not executed. In this case, it is better to not execute DVFS. Of course, if the power consumption for a case where DVFS is executed is less than that for a case where DVFS is not executed, it is better to execute DVFS.

Power consumption if DVFS executed:

$$1300 \text{ (mW} \times \text{msec)} + 65 \text{ (mW} \times \text{msec)} = 1365 \text{ (mW} \times \text{msec)} \quad (14)$$

In the discriminant, since an estimated value (expected value) is used, the value of discriminant does not necessarily reflect increases/decreases in power consumption properly. In other words, although judgment of whether to execute DVFS is based on the value D of the discriminant DVFS, the power consumption may increase. However, power consumption can be reduced the greater the number of times judgment of whether to execute DVFS is made based on the value D of the discriminant, as compared to a case where no judgment of whether to execute DVFS is made based on the value D of the discriminant. The validity of this is explained below.

A case where judgment of whether to execute DVFS is made based on the value D of the discriminant is assumed to be case 1 and a case where no judgment of whether to perform DVFS is made based on the value D of the discriminant is assumed to be case 2. Comparison of the power consumption when case 1 and case 2 have been implemented n times, respectively indicates that when n is large, the total power consumption when case 1 is implemented n times less the total power consumption when case 2 is implemented n times is less than 0. "n" is a positive integer.

The power consumption for case 2 less the power consumption for case 1 is assumed to be a random variable $X_i$. The total power consumption when case 1 is implemented n times less the total power consumption when case 2 is implemented n times is expressed by equation (15). Therefore, it suffices to indicate that the value of equation (15) is less than 0. In equations (15) to (18), i is an integer of 1 to n.

$$\sum_{i=1}^{n} X_i = X_1 + X_2 + \ldots + X_n \quad (15)$$

If the expected value of X is expressed as E[X], equation (16) holds. When the distribution of X is expressed as V[X], $E[X_i]$ is replaced by $\mu_i$, and $V[X_i]$ is replaced by $\sigma_i^2$, $\mu_i$ is 0 or less. Here, taking the average and distribution of $\Sigma X_i/n$ (in $\Sigma$, i can take a value of 1 to n), equations (16) and (17) hold.

$$E\left[\sum_{i=1}^{n} X_i/n\right] = E\left[\sum_{i=1}^{n} X_i\right]\bigg/n = \sum_{i=1}^{n} \mu_i/n < 0 \quad (16)$$

$$V\left[\sum_{i=1}^{n} X_i/n\right] = \sum_{i=1}^{n} V[X_i]/n^2 = \sum_{i=1}^{n} \sigma_i^2/n^2 \to 0(n \to \infty) \quad (17)$$

Therefore, when n is large, equation (18) holds.

$$\sum_{i=1}^{n} X_i/n < 0 \quad (18)$$

Equation (18), indicates that the value of equation (15) becomes less than 0. By setting a given number y of 0 or more and transforming equation (18), equation (19) is obtained. By further transforming equation (19), equation (20) is obtained and therefore, the greater n becomes, the greater the difference between case 1 and case 2 becomes.

$$\sum_{i=1}^{n} X_i/n < -y \quad (19)$$

$$\sum_{i=1}^{n} X_i < -ny \to -\infty(n \to \infty) \quad (20)$$

According to the second embodiment, in the electronic computer 11 that is, for example, of a distributed memory type and has parent/child relationships among all of the CPUs (#1, #2, ..., #N) 13 to 15 including the coprocessor 12, effects identical to those of the first embodiment are obtained.

FIG. 9 is a block diagram of a hardware configuration of the electronic computer according to a third embodiment. As depicted in FIG. 9, the electronic computer 11 according to the third embodiment is a shared-memory-type computing device and has a shared memory discriminant synthesizing unit connected to the bus 20. Otherwise, hardware and functional configurations of the electronic computer 11 are identical to those of the second embodiment and description thereof is omitted.

FIG. 10 is a diagram of operations until data processing is suspended at all of the CPUs in the electronic computer according to the third embodiment. As depicted in FIG. 10, in the architecture of the third embodiment, there are no parent/child relations among the coprocessor 12, the CPU#1_13, the CPU#2_14, ..., and the CPU#N_15. The coprocessor 12 and the CPUs (#1, #2, ..., #N) 13 to 15 can send messages to one another via shared memory 24.

When DVFS is to be executed, the coprocessor 12 issues a data processing suspension instruction for all of the CPUs (#1, #2, ..., #N) 13 to 15 and gives notification of a suspension of data processing (step S31). The coprocessor 12 suspends operation (step S32).

The CPUs (#1, #2, ..., #N) 13 to 15, upon receiving notification of the data processing suspension from the coprocessor 12, respectively suspend data processing (step S33 to step S35). After the CPUs (#1, #2, ..., #N) 13 to 15 have suspended data processing, the periods until the data processing at the remaining CPUs processing data is suspended are the standby periods 41, 42, and 44 of the coprocessor 12 and the CPUs (#1, #2, ..., #N) 13 to 15.

When the last remaining CPU processing data (the CPU#2_14 in the depicted example) suspends data processing, all applications are suspended (step S36). No standby period arises for the CPU that suspends data processing last, e.g., the CPU#2_14. During the standby periods 41, 42, and 44 of the coprocessor 12 and the CPUs (#1, ..., #N) 13, 15, power is wastefully consumed.

The operations depicted in FIG. 10 are the same in a case where mutual messaging is possible in a distributed-memory-type electronic computer, without parent/child relations between the coprocessor 12 and the CPUs (#1, #2, #N) 13 to 15. Therefore, in the third embodiment, the description hereinafter includes an example of the distributed-memory-type electronic computer in which mutual messaging is possible.

Depending on how time slices are assumed to be assigned to tasks, the standby periods of the CPUs can be estimated by, for example, the following 3 methods.

First Estimation Method

At the CPUs (#1, #2, #N) 13 to 15, the load of the software under execution is assumed to be equivalent and therefore, the time slices assigned for each of the tasks are equivalent and assumed to be T.

In this case, if the period $X_k$ until the CPUs (#1, #2, #N) 13 to 15 are suspended is regarded as a random variable, each period $X_k$ independently follows a uniform distribution of [0,T]. In other words, the period $X_k$ has an equivalent probability of taking a value between 0 to T; and no dependency relation is present between $X_i$ and $X_j$ (where, i≠j). Assuming the probability of the random variable X being a constant x or less to be P(X<x), for mutually independent X and Y, by a theorem, equation (21) holds.

$$P(X<x)P(Y<y)=P(X<x \text{ and } Y<y) \quad (21)$$

The probability that the period $X_k$ until the suspension of the CPU that is suspended at the latest timing is the constant x or less is expressed by equations (22) to (24) according to the range of x.

(1) If $0 < x < T$ \quad (22)

$$P(\max\{X_i \mid i = 1, 2, \ldots, N\} < x) = P\binom{X_1 < x \text{ and } X_2 <}{x \text{ and } \ldots \text{ and } X_N < x}$$
$$= P(X_1 < x) \cdot P(X_2 < x) \cdot \ldots \cdot P(X_N < x)$$
$$= x^N/T^N$$

(2) If $x \leq 0$ \quad (23)

$P(\max\{X_i \mid i = 1, 2, \ldots, N\} < x) = 0$ (3) If $x \geq T$ \quad (24)

$P(\max\{X_i \mid i = 1, 2, \ldots, N\} < x) = 1$

The probability distribution of X is obtained by the derivative of P(X<x) and therefore, assuming the probability distribution of [max{Xi|i=1, 2, ..., N}] as f(x), from equations (22) to (24), equation (25) is obtained.

$$f(x) = \begin{cases} Nx^{N-1}/T^N & (0 < x < T) \\ 0 & (x \leq 0 \text{ or } x \geq T) \end{cases} \quad (25)$$

Here, if the expected value of X is expressed as E(X), from the definition of the expected value, equation (26) is obtained.

$$E[\max\{X_i \mid i=1, 2, \ldots, N\}] = \int_{-\infty}^{\infty} xf(x)dx \qquad (26)$$

$$= \int_0^T Nx^N/T^N dx$$

$$= [Nx^{N+1}/N+1]_0^T / T^N$$

$$= NT/(N+1)$$

Further, from the linearity of the expected value, equation (27) holds and therefore, $T_{CPU\_k}$ is expressed by equation (28).

$$E(X+Y) = E(X) + E(Y) \qquad (27)$$

$$T_{CPU\_k} = E[\max\{X_i \mid i=1, 2, \ldots, N\} - X_k] \qquad (28)$$
$$= E[\max\{X_i \mid i=1, 2, \ldots, N\}] - E[X_k]$$

For an arbitrary element $i \in \{1, 2, \ldots, N\}$, expected values of X are $[E(X_i)=T/2]$ and $[E(X_0)=0]$. Therefore, from equations (26) and (28), $T_{CPU\_k}$ is expressed by equation (29), where the coprocessor 12 is assumed as the 0-th CPU and therefore, $T_{CPU\_0}$ is the standby period of the coprocessor 12.

$$T_{CPU\_k} = \begin{cases} NT/(N+1) - T/2 & (k > 0) \\ NT/(N+1) & (k = 0) \end{cases} \qquad (29)$$

Second Estimation Method

At the CPUs (#1, #2, #N) 13 to 15, the load of the applications under execution is assumed to be equivalent and the time slices of the application under execution by the CPU#k are all assumed to be $T_k$. In other words, it is assumed that the time slices of the application under execution by the CPU#1_13 are $T_1$; the time slices of the application under execution by the CPU#2_14 are $T_2$; and $T_1$ and $T_2$ need not be equivalent.

In this case, if the period $X_k$ until the CPUs (#1, #2, #N) 13 to 15 are suspended is regarded as a random variable, each $X_k$ independently follows a uniform distribution of $[0, T_k]$. This is without loss of generality even for $T_1 < T_2 < \ldots < T_N$.

The probability that the period $X_k$ until the suspension of the CPU that is suspended at the latest timing is the constant x or less is expressed by equations (30) to (32) according to the range of x for $T_1$ and $T_2$.

(1) If $x \leq 0$    (30)
$$P(\max\{X_i \mid i=1, 2, \ldots, N\} < x) = 0$$

(2) If $0 < x < T_1$    (31)
$$P(\max\{X_i \mid i=1, 2, \ldots, N\} < x) = P\begin{pmatrix} X_1 < x \text{ and } X_2 < \\ x \text{ and } \ldots \text{ and } X_N < x \end{pmatrix}$$
$$= P(X_1 < x) \cdot P(X_2 < x) \cdot \ldots \cdot P(X_N < x)$$

(3) If $T_1 < x < T_2$    (32)
$$P(\max\{X_i \mid i=1, 2, \ldots, N\} < x) = P\begin{pmatrix} X_1 < x \text{ and } X_2 < \\ x \text{ and } \ldots \text{ and } X_N < x \end{pmatrix}$$
$$= P(X_2 < x) \cdot \ldots$$
$$P(X_N < x)(\because P(X_1 < x) = 1)$$

In general, the probability that $X_k$ is the constant x or less is expressed by equations (33) and (34) according to the range of x for $T_i$ and $T_{i+1}$.

(4) If $T_i < x < T_{i+1}(i=0, 1, 2, \ldots, N-1)$    (33)
$$P(\max\{X_i \mid i=1, 2, \ldots, N\} < x) = P\begin{pmatrix} X_1 < x \text{ and } X_2 < \\ x \text{ and } \ldots \text{ and } X_N < x \end{pmatrix}$$
$$= P(X_{i+1} < x) \cdot \ldots \cdot P(X_N < x)$$
$$= x^{N-i} / \prod_{j=i+1}^{N} T_j \text{ (Where } T_0 = 0)$$

(5) If $T_N < x$    (34)
$$P(\max\{X_i \mid i=1, 2, \ldots, N\} < x) = P\begin{pmatrix} X_1 < x \text{ and } X_2 < \\ x \text{ and } \ldots \text{ and } X_N < x \end{pmatrix}$$
$$= 1$$

If the probability distribution of $[\max\{X_i \mid i=1, 2, \ldots, N\}]$ is assumed as $f(x)$, from equations (30) to (34), equation (35) is obtained.

$$f(x) = \begin{cases} (N-i)x^{N-i-1} / \prod_{j=i+1}^{N} T_j & (T_i < x < T_{i+1}) \\ 0 & (0 \leq x \text{ or } x \geq T_N) \end{cases} \qquad (35)$$

Here, if the expected value of X is expressed as $E(X)$, equation (36) is obtained.

$$E[\max\{X_i \mid i=1, 2, \ldots, N\}] = \qquad (36)$$

$$\int_{-\infty}^{\infty} xf(x)dx = \sum_{i=0}^{N-1} \left[ (N-i)x^{N-i+1} / \left\{ (N-i+1) \prod_{j=i+1}^{N} T_j \right\} \right]_{T_i}^{T_{i+1}}$$

For an arbitrary element $i \in \{1, 2, \ldots, N\}$, the expected values of X are $[E(X_i)=T_i/2]$ and $[E(X_0)=0]$. Therefore, from equations (28) and (36), $T_{CPU\_k}$ is expressed by equation (37), where the coprocessor 12 is assumed as the 0-th CPU and therefore, $T_{CPU\_0}$ is the standby period of the coprocessor 12.

$$T_{CPU\_k} = \qquad (37)$$

$$\begin{cases} \sum_{i=0}^{N-1} \left[ (N-i)x^{N-i+1} / \left\{ (N-i+1) \prod_{j=i+1}^{N} T_j \right\} \right]_{T_i}^{T_{i+1}} - T_k/2 & (k > 0) \\ \sum_{i=0}^{N-1} \left[ (N-i)x^{N-i+1} / \left\{ (N-i+1) \prod_{j=i+1}^{N} T_j \right\} \right]_{T_i}^{T_{i+1}} & (k = 0) \end{cases}$$

Third Estimation Method

Here, it is assumed that time slices may vary according to CPU#k and that at the CPUs (#1, #2, #N) 13 to 15, time slices may vary according to task. The time slice of a task under execution by the CPU#k is assumed to be $T_{(1)k}, \ldots, T_{(m)k}$, where m is an integer of 2 or more and may vary according to the value of k. "k" is an integer of 1 to N.

In this case, the period $X_k$ until the CPUs (#1, #2, #N) 13 to 15 are suspended is regarded as a random variable.

Further, if each $Y_{(i)k}$ is assumed to independently follow a uniform distribution of $[0,T_{(i)k}]$, $X_k$ is expressed by equation (38). Therefore, the expected value $E[X_k]$ is expressed by equation (39).

$$X_k = Y_{(1)k}(T_{(1)k}/(T_{(1)k}+T_{(2)k}+\ldots+T_{(m)k})) + \ldots + Y_{(m)k}(T_{(m)k}/(T_{(1)k}+T_{(2)k}+\ldots+T_{(m)k})) \quad (38)$$

$$E[X_k] = (T_{(1)k}^2 + \ldots + T_{(m)k}^2)/\{2(T_{(1)k}+\ldots+T_{(m)k})\} \quad (39)$$

If $X_k$ is approximated by uniform distribution, $X_k$ follows a uniform distribution of $[0,T_k]$, where $T_k$ in this case is expressed by equation (40). This is without loss of generality even for $T_1 < T_2 < \ldots < T_N$.

$$E[X_k] = (T_{(1)k}^2 + \ldots + T_{(m)k}^2)/(T_{(1)k}+\ldots+T_{(m)k}) \quad (40)$$

Similar to the equation derivation method in the second estimation method, when $T_{CPU\_k}$ is obtained, equation (37) is obtained, where in equation (37), $T_k$ is obtained by equation (40).

In the third embodiment, explanation of the results of recursive judgment concerning DVFS execution, using the method of estimating the operation suspension period of the bus, the discriminant derivation method, the power control method and the discriminant is the same as that in the second embodiment and is therefore omitted.

According to the third embodiment, with a shared memory configuration or a configuration without parent/child relations between the CPUs (#1, #2, #N) 13 to 15 including the coprocessor 12, such as in the electronic computer 11 configured to have distributed memory, effects identical to those of the first embodiment are obtained.

The power control apparatus, the electronic computer, and the power control method of the embodiments enable power consumption to be reduced.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A power control apparatus comprising
a processor configured to:
collect first information related to operation of a performing unit configured to perform data processing and second information related to operation of a bus configured to transfer data;
determine an operating frequency and an operating voltage for the performing unit, based on the first information and the second information;
estimate based on the first information and the second information, a first period elapsing until the performing unit suspends data processing that is being performed and a second period elapsing until the bus suspends data transmission that is being conducted;
derive a discriminant that obtains a difference of total power consumption and power consumption pre-switching, the total power consumption being power consumed in a case of switching the operation of the performing unit based on the determined operating frequency and operating voltage plus power consumed during the estimated first and second periods; and
execute a switching of an operating frequency and an operating voltage of the performing unit, based on a value of the discriminant.

2. The power control apparatus according to claim 1, wherein
the first information includes third information concerning a load of a task under execution by the performing unit, and
the processor estimates the first period, based on the third information.

3. The power control apparatus according to claim 1, wherein
the second information includes fourth information indicating whether the bus is being operated for direct memory access and fifth information concerning a data volume transferred by one direct memory access, and
the processor estimates the second period, based on the fourth information and the fifth information.

4. The power control apparatus according to claim 1, further comprising
a changing unit configured to change the operating frequency and the operating voltage of the performing unit, wherein
the processor executes the switching when the value of the discriminant is less than zero, and
the changing unit changes any one among the operating frequency and the operating voltage of the performing unit to the operating frequency or the operating voltage determined for the performing unit by the processor, if the processor executes the switching.

5. The power control apparatus according to claim 1, wherein
the processor collects for each performing unit among a plurality of the performing units, the first information,
the processor determines for each performing unit among the plurality of performing units, the operating frequency and the operating voltage,
the processor estimates for each performing unit among the plurality of the performing units, the first period, determines for each performing unit among the plurality of the performing units, power consumed during the estimated first period, and sums the power as the total power consumption, and
the processor executes the switching when among the plurality of the performing units, a performing unit is present for which a post-switching operating frequency and a post-switching operating voltage are less than a pre-switching operating frequency and a pre-switching operating voltage and for other performing units among the plurality of the performing units, the post-switching operating frequency and the post-switching operating voltage are less than or equal to the pre-switching operating frequency and the pre-switching operating voltage.

6. An electronic computer comprising:
a performing unit configured to perform data processing; and
a bus configured to transfer data; and
a processor configured to:
collect first information related to operation of the performing unit and second information related to operation of the bus;
determine an operating frequency and an operating voltage for the performing unit, based on the first information and the second information;

estimate based on the first information and the second information, a first period elapsing until the performing unit suspends data processing that is being performed and a second period elapsing until the bus suspends data transmission that is being conducted;

derive a discriminant that obtains a difference of total power consumption and power consumption pre-switching, the total power consumption being power consumed in a case of switching the operation of the performing unit based on the determined operating frequency and operating voltage plus power consumed during the estimated first and second periods; and execute a switching of an operating frequency and an operating voltage of the performing unit, based on a value of the discriminant.

7. The electronic computer according to claim 6, wherein the first information includes third information concerning a load of a task under execution by the performing unit, and the processor estimates the first period, based on the third information.

8. The electronic computer according to claim 6, wherein the second information includes fourth information indicating whether the bus is being operated for direct memory access and fifth information concerning a data volume transferred by one direct memory access, and the processor estimates the second period, based on the fourth information and the fifth information.

9. The electronic computer according to claim 6, further comprising a changing unit configured to change the operating frequency and the operating voltage of the performing unit, wherein the processor executes the switching when the value of the discriminant is less than zero, and the changing unit changes any one among the operating frequency and the operating voltage of the performing unit to the operating frequency or the operating voltage determined for the performing unit by the processor, if the processor executes the switching.

10. The electronic computer according to claim 6, wherein the processor collects for each performing unit among a plurality of the performing units, the first information, the processor determines for each performing unit among the plurality of performing units, the operating frequency and the operating voltage, the processor estimates for each performing unit among the plurality of the performing units, the first period, determines for each performing unit among the plurality of the performing units, power consumed during the estimated first period, and sums the power as the total power consumption, and the processor executes the switching when among the plurality of the performing units, a performing unit is present for which a post-switching operating frequency and a post-switching operating voltage are less than a pre-switching operating frequency and a pre-switching operating voltage and for other performing units among the plurality of the performing units, the post-switching operating frequency and the post-switching operating voltage are less than or equal to the pre-switching operating frequency and the pre-switching operating voltage.

11. A power control method comprising:

collecting first information related to operation of a performing unit configured to perform data processing and second information related to operation of a bus configured to transfer data;

determining an operating frequency and an operating voltage for the performing unit, based on the first information and the second information;

estimating based on the first information and the second information, a first period elapsing until the performing unit suspends data processing that is being performed and a second period elapsing until the bus suspends data transmission that is being conducted;

deriving a discriminant that obtains a difference of total power consumption and power consumption pre-switching, the total power consumption being power consumed in a case of switching the operation of the performing unit based on the determined operating frequency and operating voltage plus power consumed during the estimated first and second periods; and executing a switching of an operating frequency and an operating voltage of the performing unit, based on a value of the discriminant, wherein the power control method is executed by a processor.

12. The power control method according to claim 11, wherein the first information includes third information concerning a load of a task under execution by the performing unit, and the estimating includes estimating the first period, based on the third information.

13. The power control method according to claim 11, wherein the second information includes fourth information indicating whether the bus is being operated for direct memory access and fifth information concerning a data volume transferred by one direct memory access, and the estimating includes estimating the second period, based on the fourth information and the fifth information.

14. The power control method according to claim 11, wherein the executing includes executing the switching when the value of the discriminant is less than zero, and further comprising changing any one among the operating frequency and the operating voltage of performing unit to the operating frequency or the operating voltage determined for the performing unit at the determining, if the switching is executed.

15. The power control method according to claim 11, wherein the collecting includes collecting for each performing unit among a plurality of the performing units, the first information, the determining includes determining for each performing unit among the plurality of performing units, the operating frequency and the operating voltage, the estimating includes estimating for each performing unit among the plurality of the performing units, the first period, the power control method further comprising:

determining for each performing unit among the plurality of the performing units, power consumed during the estimated first period; and summing the power as the total power consumption, wherein the executing includes executing the switching when among the plurality of the performing units, a performing unit is present for which a post-switching operating frequency and a post-switching operating voltage are less than a pre-switching operating frequency and a pre-switching operating voltage and for other performing units among the plurality of the performing units, the post-switching operating frequency and the post-switching operating voltage are less than or equal to the pre-switching operating frequency and the pre-switching operating voltage.

* * * * *